US010871902B2

(12) United States Patent
Dias et al.

(10) Patent No.: US 10,871,902 B2
(45) Date of Patent: Dec. 22, 2020

(54) ADAPTIVE LOOK-AHEAD CONFIGURATION FOR PREFETCHING DATA IN INPUT/OUTPUT OPERATIONS BASED ON REQUEST SIZE AND FREQUENCY (71) Applicant: EMC IP Holding Company LLC, Hopkinton, MA (US)

(72) Inventors: Jonas F. Dias, Rio de Janeiro (BR); Rômulo Teixeira de Abreu Pinho, Niterói (BR); Adriana Bechara Prado, Niterói (BR); Vinícius Michel Gottin, Rio de Janeiro (BR); Tiago Salviano Calmon, Rio de Janeiro (BR); Eduardo Vera Sousa, Niterói (BR); Owen Martin, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/397,596

(22) Filed: Apr. 29, 2019

(65) Prior Publication Data
US 2020/0341813 A1 Oct. 29, 2020

(51) Int. Cl.
G06F 3/06 (2006.01)
G06F 12/0862 (2016.01)
G06F 12/0895 (2016.01)

(52) U.S. Cl.
CPC .......... G06F 3/061 (2013.01); G06F 3/0656 (2013.01); G06F 3/0683 (2013.01); G06F 12/0862 (2013.01); G06F 12/0895 (2013.01)

(58) Field of Classification Search
CPC ...... G06F 9/5016; G06F 3/061; G06F 3/0656; G06F 3/0683; G06F 3/0611; G06F 3/064;
(Continued)

(56) References Cited

U.S. PATENT DOCUMENTS 6,092,149 A 7/2000 Hicken et al.
7,359,890 B1 * 4/2008 Ku .................... G06F 16/24552
(Continued)

OTHER PUBLICATIONS

Atzori et al., "The Internet of Things: A survey," Computer Networks, 54 (2010) 2787-2805.
(Continued)

Primary Examiner — Michael Krofcheck
(74) Attorney, Agent, or Firm — Ryan, Mason & Lewis, LLP (57) ABSTRACT Techniques are provided for adaptive look-ahead configuration for data prefetching based on request size and frequency. One method comprises performing the following steps: estimating an earning value for a particular portion based on an average size and frequency of past input/output requests for the particular portion; calculating a quota for the particular portion by normalizing the earning value for the particular portion of the storage system based on earning values of one or more additional portions of the storage system; obtaining a size of a look-ahead window for a new request based on the quota for the particular portion over a prefetch budget assigned to the storage system; and moving a requested data item and one or more additional data items within the look-ahead window from the storage system to the cache memory responsive to the requested data item and/or the additional data items within the look-ahead window not being in the cache memory.

20 Claims, 8 Drawing Sheets

(58) Field of Classification Search
CPC .... G06F 3/0655; G06F 3/0658; G06F 3/0659; G06F 3/067; G06F 12/0862; G06F 12/0895; G06F 12/0866

See application file for complete search history.

(56) References Cited

U.S. PATENT DOCUMENTS

| | | | |
|---|---|---|---|
| 8,429,351 B1 | 4/2013 | Yu et al. | |
| 8,667,224 B1 | 3/2014 | Yu et al. | |
| 2001/0016897 A1* | 8/2001 | Bates, Jr. ............ | G06F 12/0862 711/137 |
| 2003/0028694 A1* | 2/2003 | Aboulenein ........ | G06F 13/4031 710/107 |
| 2007/0214325 A1* | 9/2007 | Sasamoto ........... | G06F 12/0862 711/137 |
| 2008/0229027 A1 | 9/2008 | Shioya et al. | |
| 2015/0324135 A1 | 11/2015 | Chan et al. | |
| 2016/0098212 A1 | 4/2016 | Tokoyoda et al. | |
| 2018/0067961 A1* | 3/2018 | Yang ................... | G06F 12/0862 |

OTHER PUBLICATIONS

Schooler et al., "Architectural Vision for a Data-Centric IoT: Rethinking Things, Trust and Clouds," In Distributed Computing Systems (ICDCS), 2017 IEEE 37th International Conference on (pp. 1717-1728). IEEE.
Bonomi et al., "Fog computing and its role in the internet of things," In Proceedings of the first edition of the MCC workshop on Mobile cloud computing (pp. 13-16). ACM, 2012.
Shi et al., "Edge computing: Vision and challenges," IEEE Internet of Things Journal, 3(5), 637-646.
Mahadev et al., "The Case for VM-Based Cloudlets in Mobile Computing, Pervasive Computing," IEEE, 8 (2009) 14-23.
Morabito et al., "Consolidate IoT edge computing with lightweight virtualization," IEEE Network, 32(1), 102-111.
Ismail et al., "Evaluation of docker as edge computing platform," In Open Systems (ICOS), 2015 IEEE Confernece on (pp. 130-135). IEEE.
Mahmud et al., "Fog computing: A taxonomy, survey and future directions," In Internet of Everything (pp. 103-130). Springer, Singapore.
Inaba et al., "Applications of weighted Voronoi diagrams and randomization to variance-based k-clustering," In Proceedings of the tenth annual symposium on Computational geometry (pp. 332-339). ACM.
Thönes, J. "Microservices." IEEE Software 32.1 (2015): 116-116.
Lewis et al., "Microservices," Available in: http://martinfowler.com/articles/microservices.html. Access in: Sep. 27, 2017.
Pahl et al., "Containers and clusters for edge cloud architectures—a technology review," In Future Internet of Things and Cloud (FiCloud), 2015 3rd International Conference on (pp. 379-386). IEEE.
Misra et al., "On Theoretical Modeling of Sensor Cloud: A Paradigm Shift From Wireless Sensor Network," IEEE Systems Journal, vol. 11, No. 2, pp. 1084-1093, Jun. 2017.
Taleb et al., "Mobile edge computing potential in making cities smarter," IEEE Communications Magazine, 55(3), 38-43.
Bouzeghoub, M., "A framework for analysis of data freshness," In Proceedings of the 2004 international workshop on Information quality in information systems (pp. 59-67). ACM.
"CEP," Available in: https://en.wikipedia.org/wiki/Complex_event_processing.
"Publish—subscribe pattern," Available in: https://en.wikipedia.org/wiki/Publish%E2%80%93subscribe_pattern.
Chatterjee et al., "Optimal Composition of a Virtual Sensor for Efficient Virtualization within Sensor-Cloud," in Proceedings of IEEE International Conferencce on Communications, Jun. 2015, pp. 448-453.
Yi et al., "A survey of fog computing: concepts, applications and issues." Proceedings of the 2015 Workshop on Mobile Big Data. ACM, 2015.
Santos et al., "Olympus: The cloud of sensors," IEEE Cloud Computing, 2(2), 48-56.
Delicato et al.,. "The Resource Management Challenge in IoT," In Resource Management for Internet of Things (pp. 7-18). Springer International Publishing (2017).
Wang et al., "ENORM: A framework for edge node resource management," IEEE Transactions on Services Computing (2017).
Skarlat et al., "Resource Provisioning for IoT Services in the Fog," 2016 IEEE 9th International Conference on Service-Oriented Computing and Applications (SOCA), Macau, 2016, pp. 32-39.
Roy et al., "DIVISOR: Dynamic Virtual Sensor Formation for Overlapping Region in IoT-based Sensor-Cloud," Proceedings of the IEEE Wireless Communications and Networking Conference, 2018.
Skarlat et al., "Optimized IoT service placement in the fog," Serv. Oriented Comput. Appl. 11, 4 (Dec. 2017), 427-443. DOI: https://doi.org/10.1007/s11761-017-0219-8 (2017).
Dautov et al., "Pushing Intelligence to the Edge with a Stream Processing Architecture," 2017 IEEE International Conference on Internet of Things (iThings) and IEEE Green Computing and Methods and Apparatus for Real-Time Anomaly Detection over Sets of Time Series—Nov. 2017 Dell EMC Confidential pp. 24 of 24 Communications (GreenCom) and IEEE Cyber, Physical and Social Computing (CPSCom) and IEEE Smart Data (SmartData), Exeter, 2017, pp. 792-799.
"Hypervisor," Available in: https://en.wikipedia.org/wiki/Hypervisor.
"EdgeX Foundry," Available in: https://www.edgexfoundry.org.
"Orion Context Broker," Available in: https://catalogue.fiware.org/enablers/publishsubscribe-context-broker-orion-context-broker.
"FIWARE NGSI Open RESTful API Specification," Available in: http://forge.fiware.org/plugins/mediawiki/wiki/fiware/index.php/FIWARE_NGSI_Open_RESTful_API_Specification. Last accessed: Jun. 28, 2018.
"ZeroMQ," Available in: https://en.wikipedia.org/wiki/ZeroMQ.
D. Merkel, "Docker: Lightweight Linux Containers for Consistent Development and Deployment," Linux Journal, vol. 2, p. 234, (2014).
K. Hornik, "Approximation capabilities of multilayer feedforward networks," Neural networks, vol. 2, No. 4, pp. 251-257, 1991.
Betts, et al., "Estimating the WCET of GPU-accelerated applications using hybrid analysis," Real-Time Systems (ECRTS), 2013.
U.S. Appl. No. 15/941,434, entitled, "Allocation of Shared Computing Resources Using Source Code Feature Extraction and Machine Learning", filed Mar. 30, 2018.
U.S. Appl. No. 16/039,743, entitled, "Allocation of Shared Computing Resources Using Source Code Feature Extraction and Clustering-Based Training of Machine Learning Models", filed Jul. 19, 2018.
U.S. Appl. No. 16/259,244, entitled, Building Neural Networks for Resource Allocation for Iterative Workloads Using Reinforcement Learning, filed Jan. 28, 2019.
U.S. Appl. No. 16/034,432, entitled, "Resource Allocation and Provisioning in a Multi-Tier Edge-Cloud Virtualization Environment", filed Jul. 13, 2018.
U.S. Appl. No. 16/263,135 entitled, "Adaptive Look-Ahead Configuration for Prefetching Data in Input/Output Operations," filed Jan. 31, 2019.
U.S. Appl. No. 16/508,347 entitled, "Real-Time Pre-Fetch Determinaton Based on LUN-specific Sequential Patterns," filed Jul. 11, 2019.
U.S. Appl. No. 16/671,617 entitled, "Sequentiality Characterization of Input/Output Workloads," filed Nov. 1, 2019.
Ester et al., "A density-based algorithm for discovering clusters in large spatial databases with noise," in Proceedings of the Second International Conference on Knowledge Discovery and Data Mining (KDD-96), 1996.
Van Der Maaten et al., "Visualizing Data Using t-SNE," Journal of Machine Learning Research, vol. 9, pp. 2579-2605, 2008.
U.S. Appl. No. 16/400,289, entitled, "Adaptive Controller for Online Adaptation of Resource Allocation Policies for Iterative Workloads Using Reinforcement Learning", filed May 1, 2019.

(56) References Cited

OTHER PUBLICATIONS

U.S. Appl. No. 16/401,604, entitled, "Resourse Allocation and Provisioning in a Multi-Tier Edge-Cloud Virtualization Environment", filed May 2, 2019.
Cao et al., "ALACC: Accelerating Restore Performance of Data Deduplication Systems Using Adaptive Look-Ahead Window Assisted Chunk Caching", Proceedings of the 16th USENIX Conference on File and Storage Technologies, Oakland, CA (Feb. 12-15, 2018).

* cited by examiner

ADAPTIVE LOOK-AHEAD CONFIGURATION FOR PREFETCHING DATA IN INPUT/OUTPUT OPERATIONS BASED ON REQUEST SIZE AND FREQUENCY

FIELD

The field relates generally to caching techniques for input/output operations.

BACKGROUND

Prefetching is a known technique for optimizing cache behavior. Prefetching exploits data locality with the assumption that applications often request data residing in sequential addresses in a given address space. Despite the fact that prefetching generally tends to yield good results, the performance is often dependent on a good choice for a size of the look-ahead window, leading to unnecessary cache evictions if the look-ahead window size is not selected properly. The choice of look-ahead window size, in turn, is dependent on how applications that access a given storage device traverse the address space of the storage device when requesting data.

A need exists for adaptive look-ahead techniques for data prefetching that depend on characteristics of the workload of the applications that access the storage system.

SUMMARY

In one embodiment, a method comprises, in response to a request for at least one data item residing in a particular portion of a storage system that employs a cache memory, performing the following steps, using at least one processing device: estimating an earning value for the particular portion of the storage system based on an average size and frequency of past input/output requests for the particular portion of the storage system; calculating a quota for the particular portion of the storage system by normalizing the earning value for the particular portion of the storage system based on one or more earning values of one or more additional portions of the storage system; obtaining a size of a look-ahead window for the request based on the quota for the particular portion of the storage system over a prefetch budget assigned to the storage system; and moving the requested at least one data item and one or more additional data items within the look-ahead window from the storage system to the cache memory responsive to one or more of the requested at least one data item and the additional data items within the look-ahead window not being in the cache memory.

In some embodiments, the earning value, the quota and/or the size of the look-ahead window can be varied over time. For example, one or more embodiments assign a larger look-ahead window to particular portions of the storage system that exhibit a larger average size of the input/output requests; and/or assign a larger look-ahead window to particular portions of the storage system that exhibit a smaller average time distance between requests of the input/output requests.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for adaptive look-ahead configuration for data prefetching based on request size and frequency.

As noted above, data prefetching is a known technique for optimizing cache behavior. Prefetching exploits data locality with the assumption that applications often request data residing in sequential addresses in a given address space. Namely, when an operating system of a device receives a data access request at a certain address, $A_i$, the operating system retrieves not only the content of that location, but also the contents of the N next address locations, $\{A_{i+1}, \ldots, A_{i+N}\}$, before the application actually requests the data from those other addresses. The operating system then places the retrieved content in a cache, which is typically a faster storage media than the storage media where the data originally resides. If the application indeed requests data from subsequent addresses, the operating system satisfies those requests directly from the cache, instead of fetching data from the slower storage media for each request. The parameter N defines the number of sequential addresses that the operating system prefetches to the cache at each request, and it is often referred to as the look-ahead window.

Despite the fact that prefetching tends to yield very good results in general, prefetching is dependent on a good choice for the look-ahead window. Such dependency arises from the fact that the cache size is usually much smaller than the actual storage size. As a result, the cache needs to employ a data eviction policy to make space for new data whenever the cache is full. Incorrect look-ahead windows may thus lead to unnecessary data eviction, reducing the overall cache performance.

The choice of the look-ahead window, in turn, is dependent on how the applications that access the device traverse the address space of the storage system when requesting data. One or more aspects of the present disclosure thus recognize that look-ahead windows should be adaptive. However, storage system vendors typically employ a single, fixed cache policy in their products. Although such policies work well on average, they fail to capture the nuances of the access patterns associated with the applications, losing a tremendous opportunity for optimization.

One or more embodiments of the present disclosure address this cache optimization problem by automatically and adaptively estimating different look-ahead windows based on request size and frequency for each portion of the storage system (e.g., for each LUN) in order to improve cache use and application performance in general.

Advanced enterprise storage systems typically have a single prefetching policy, with one fixed look-ahead window configuration. This is not ideal because several applications, with different data access patterns, may access the storage system concurrently. Each access pattern traverses the address space of the system differently. For instance, some access patterns might be sequential, while other access patterns might be random; some access patterns might traverse the entire address space, while other access patterns might be concentrated in a small range of addresses.

In addition, system administrators often subdivide storage systems into many logically separated storage areas, often referred to as LUNs or thin devices (TDEVs), each with its own addressable space defined in logical blocks addresses (LBAs). Enterprise-grade applications are configured to leverage the underlying storage configuration, and sometimes even determine how the storage should be configured. Consequently, LUN configurations might even be different for the same application running in different places. For instance, a database administrator (DBA) working at "Bank A" might configure the LUNs for the bank's database management system (DBMS) differently than a DBA working at "Bank B" might configure them for the DBMS of Bank B.

Access patterns also vary with time and often reflect aspects of the seasonality of the operations associated with them. Therefore, in some embodiments, the disclosed techniques for automatic, adaptive prefetching employ adaptive cache policies both in terms of how a storage system is subdivided into LUNs and in terms of how those LUNs are accessed across time. Furthermore, cache management policies should have relatively small computation costs (e.g., small CPU and memory usage) to avoid performance hindrances in real storage systems.

For a discussion of related techniques for adaptive prefetching, see, for example, U.S. patent application Ser. No. 16/263,135, filed Jan. 31, 2019, entitled "Adaptive Look-Ahead Configuration for Prefetching Data in Input/Output Operations," incorporated by reference herein in its entirety.

One or more embodiments of the disclosure provide automatic, adaptive prefetching techniques to estimate a different look-ahead window for each LUN in the storage system based on the average size and on the frequency of requests having a given LUN as the target. The disclosed techniques improve the storage system performance in general, with a relatively small computational footprint.

Figure 1:
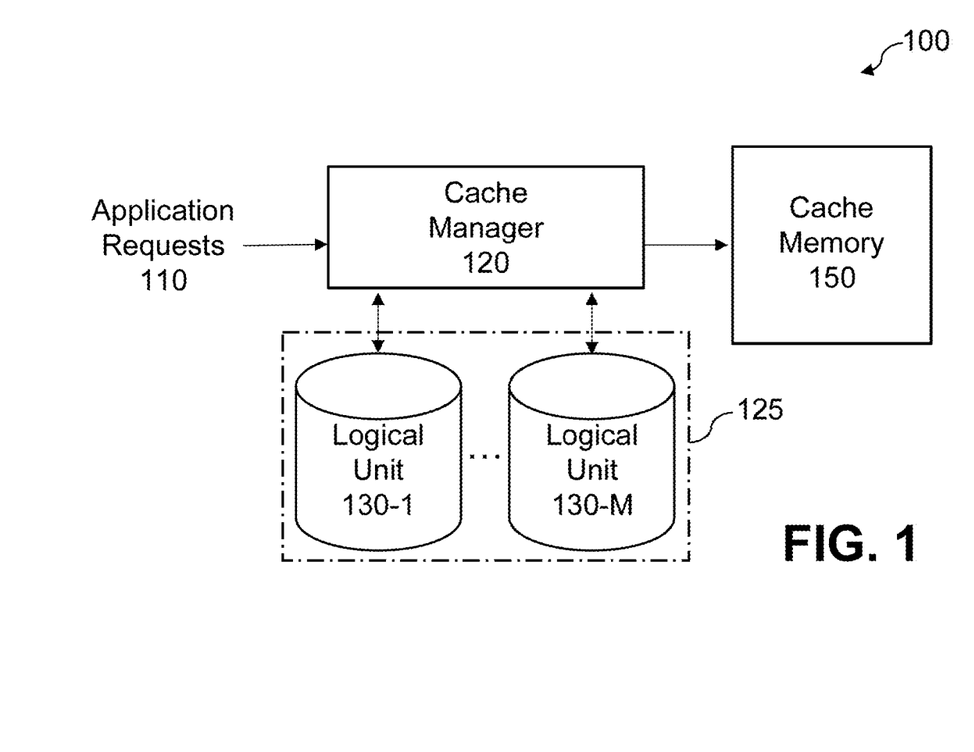
FIG. 1 illustrates an exemplary storage environment, according to one embodiment of the disclosure.

FIG. 1 illustrates an exemplary storage environment 100, according to one embodiment of the disclosure. As shown in FIG. 1, the exemplary storage environment 100 comprises a cache manager 120 that processes one or more application requests 110 from one or more applications (not shown in FIG. 1). An exemplary storage system 125 comprises one or more logical units 130-1 through 130-M. In further variations, physical storage units can be employed in the exemplary storage environment 100 in addition to, or instead of, the logical units 130 shown in FIG. 1. Likewise, while one or more exemplary embodiments refer to logical addresses, physical addresses can also be employed, as would be apparent to a person of ordinary skill in the art.

For an application request 110 at a certain address, $A_i$, the cache manager 120 retrieves the content of that location ($A_i$), but also the contents of the N next address locations, $\{A_{i+1}, \ldots, A_{i+N}\}$, before the application actually requests the data from those other addresses, and the cache manager 120 places the retrieved content in a cache memory 150.

Figure 2:
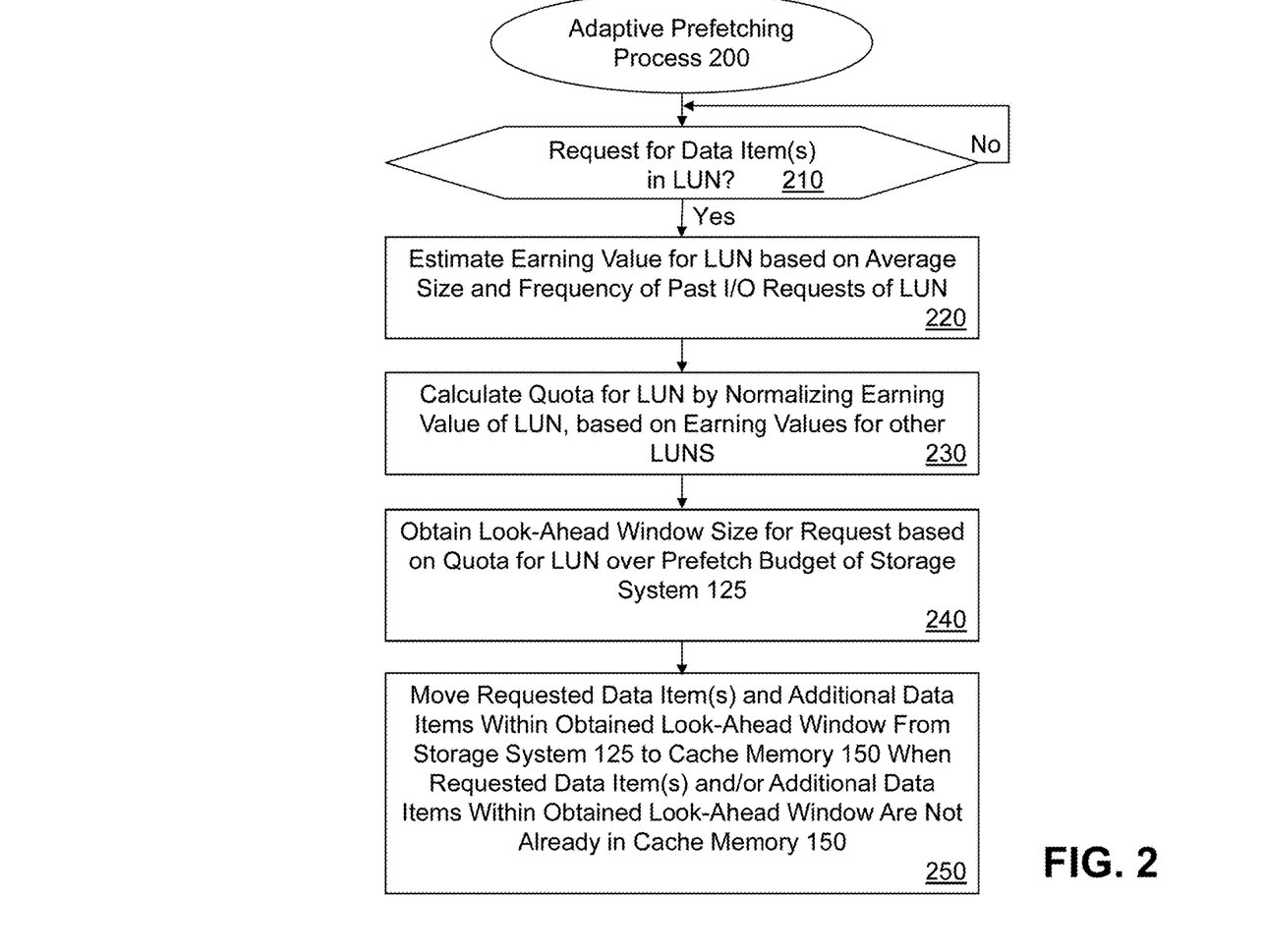
FIG. 2 illustrates an exemplary adaptive prefetching process that performs a look-ahead optimization for each logical unit (LUN) of a storage system based on request size and frequency, according to at least one embodiment of the disclosure.

FIG. 2 illustrates an exemplary adaptive prefetching process 200 that performs a look-ahead optimization for each LUN of a storage system based on request size and frequency, according to at least one embodiment of the disclosure. As shown in FIG. 2, a test is performed during step 210 to determine if a request is received for a data item residing in a particular portion of the storage system 125, such as a LUN. Once it is determined during step 210 that a request is received for one or more data items, the exemplary adaptive prefetching process 200 estimates an earning value for the particular portion of the storage system during step 220 based on an average size and frequency of past input/output (I/O) requests for the particular portion of the storage system.

During step 230, the exemplary adaptive prefetching process 200 calculates a quota for the particular portion of the storage system by normalizing the earning value for the particular portion of the storage system based on one or more earning values of one or more additional portions of the storage system.

As shown in FIG. 2, the exemplary adaptive prefetching process 200 obtains a look-ahead window size for the request during step 240 based on the calculated quota for the particular portion of the storage system over a prefetch budget of the entire storage system 125.

During step 250, the exemplary adaptive prefetching process 200 moves the requested one or more data items as well as additional data items within the obtained look-ahead window from the storage system 125 to the cache memory 150, when the requested one or more data items and/or the additional data items within the obtained look-ahead window are not already in the cache memory 150.

As noted above, one or more embodiments of the disclosure provide a cache policy based on the average size and frequency of the requests for each LUN of the storage system 125. The intuition behind the disclosed policy is based on the notion of a return of investment (e.g., which LUN will give the best return (cache performance) for a more aggressive prefetch investment for the LUN). However, the decision of whether to invest in a LUN needs to follow a criterion, using features from the observed I/O traces. Based on a correlation analysis between the precomputed optimal look-ahead windows and features from the I/O traces, it has been observed that LUNs that make bigger requests deserve more investment as well as LUNs that make requests more often.

Figure 3:
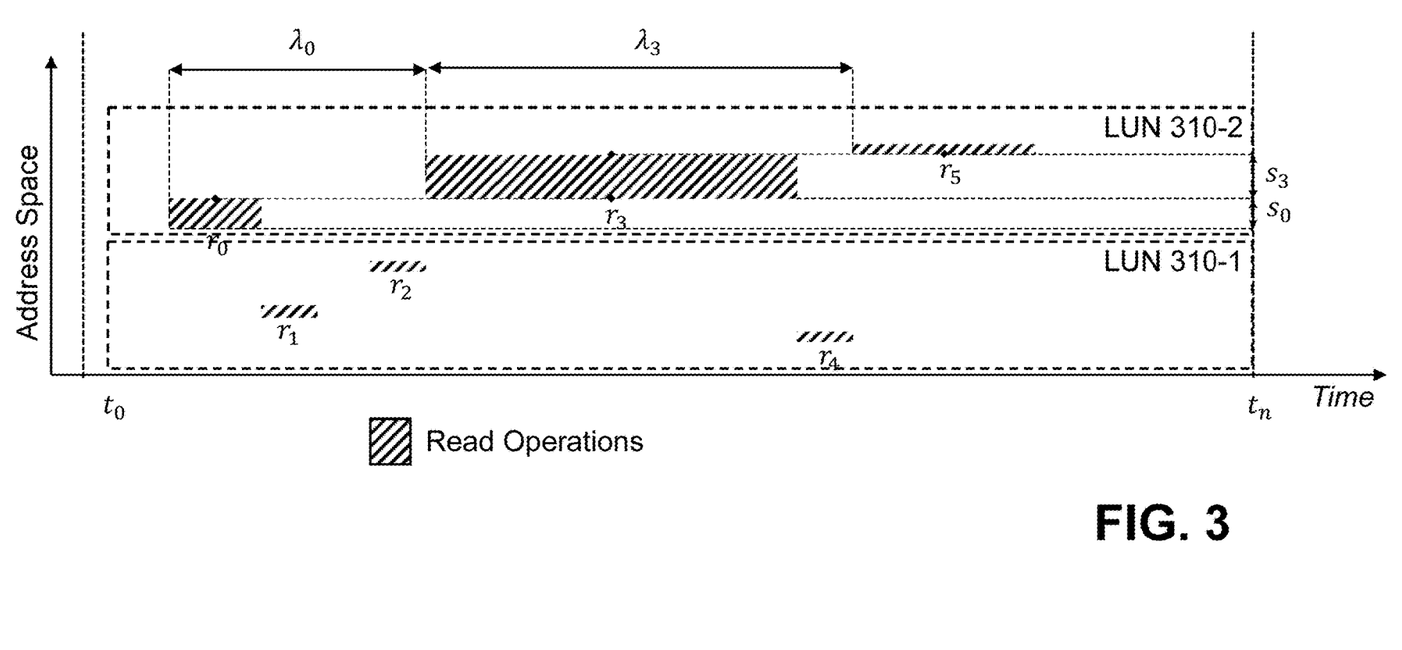
FIG. 3 illustrates two LUNs requesting read operations over time, according to some embodiments of the disclosure.

FIG. 3 illustrates two LUNs (LUN 310-1 and LUN 310-2) requesting read operations over time, according to some embodiments of the disclosure. As shown in FIG. 3, if LUN 310-2 is given a bigger look-ahead window than LUN 310-1, LUN 310-2 will probably improve the cache performance, because both the average size of the requests, $r_0$, $r_3$, $r_5$, of LUN 310-2, is higher than the requests, $r_1$, $r_2$, $r_4$, of LUN 310-1, and the average distance in time between them is shorter. The performance of the disclosed policy has been demonstrated via simulations with real I/O requests collected from production systems, and compared with a baseline policy that is implemented in one or more existing storage systems.

In the exemplary simulation engine, a fixed-size buffer was defined to represent the cache of a particular storage system. Then, the I/O requests associated with that system were traversed in order of occurrence. For each request, if the LBA reference is already in the cache, the cache-hit count was increased. If not, the LBA was brought to the cache and the cache-hit count was not increased. The latter situation thus defines a cache-miss. With prefetching, the requested address, $A_i$, is retrieved as well as the N subsequent ones, $\{A_{i+1}, \ldots, A_{i+N}\}$, if they are not in the cache. When the cache buffer is full, the traditional Least Recently Used (LRU) policy is used in some embodiments to evict data from the cache before filling it up with new address references.

Consider a set $\mathcal{R} = \{r_0, r_1, \ldots r_m\}$ of all requests $r_i$ across all LUNs in the system. $s_i$ is defined as the size of request $r_i$ and $\lambda_i$ as the distance in time between requests $r_i$ and $r_j$, where $r_j$ is the next request in the same LUN as $r_i$. Notice that $r_j$ is not necessarily equal to $r_{i+1}$, since the requests are globally indexed (across all LUNs).

In the example of FIG. 3, the distances $\lambda_0$ between requests $r_0$ and $r_3$, and $\lambda_3$ between requests $r_3$ and $r_5$ are highlighted. The sizes $s_0$ and $s_3$ of the same requests are also annotated. It is noted that $\lambda_i$ can be measured in seconds (or another time unit) but also as a function of the number of other requests between requests $r_i$ and $r_j$. This is useful because some storage systems may not register timestamps for each request but, still, the request's ordering can be used as a useful measure for the purposes of determining an appropriate look-ahead window for adaptive prefetch. Furthermore, even if the system does register timestamps, those may not be synchronized among CPU cores. Thus, using the distance between requests in the ordered request queue may be beneficial.

For each LUN of the storage system, the average sizes $\bar{s}$ and the average distance $\bar{\lambda}$ of the requests intended for that LUN are measured over a predefined period T.

Let $R_{LUN} \subseteq \mathcal{R}$ be the set of requests of a certain LUN contained within period T In the simplified example of FIG. 2 the period T comprises only three requests of LUN 2 between $t_0$ and $t_n$. Then, $$\bar{s}_{LUN} = \frac{\sum_{r_x \in R_{LUN}} s_x}{|R_{LUN}|} \text{ and } \bar{\lambda}_{LUN} = \frac{\sum_{r_x \in R_{LUN}} \lambda_x}{|R_{LUN}|}.$$

Then, the measure of earnings e of that LUN is computed as $$e_{LUN} = \frac{\bar{s}_{LUN}}{\bar{\lambda}_{LUN}}.$$

Since $1/\bar{\lambda}$ is a rough approximation of the frequency of the requests, the earning is essentially based on request size and frequency. At a given instant in time, each LUN has its own measurement $e_{LUN}$. Additional aspects of this computation are discussed below, after defining the normalized earnings and their impact on the LUN-specific look-ahead windows.

In order to define the look-ahead window, the sum of e for all the LUNs is first computed, in one or more embodiments, as follows:

$$E = \Sigma_{\forall LUN} e_{LUN}.$$

With that, a normalized value for individual earnings $e_{LUN}$ can be computed, as follows:

$$\tilde{e}_{LUN} = \frac{e_{LUN}}{E} = \frac{\bar{s}_{LUN}}{\bar{\lambda}_{LUN} E}.$$

It is noted that $\Sigma_{\forall LUN} \tilde{e}_{LUN} = 1$. This normalized value is useful because the look-ahead of a LUN is set in some embodiments to be a fraction of a budget, B, proportional to the normalized earnings of that LUN. Thus, the look-ahead window $w_{LUN}$ is defined for each LUN, as follows:

$$w_{LUN} = \alpha(B \times \tilde{e}_{LUN}) + \beta.$$

Again, it is noted that $\Sigma_{\forall LUN} w_{LUN} = \alpha\beta + \beta$. The parameter $\alpha$ is a scale factor that can optionally be used to adjust the policy as if it were working with a bigger or smaller budget. The parameter $\beta$ is an optional minimum look-ahead window reserved for each LUN of the system. However, the parameters $\alpha$ and $\beta$ can also be set to 1 and 0, respectively.

The look-ahead windows for each LUN can be updated whenever necessary. Since the updates may be costly for the cache manager 120, the update frequency can be set up appropriately based on workload characteristics. For example, if the disk access patterns change quite often in the storage system, the look-ahead windows should be updated accordingly. Furthermore, the computation described above takes into account a period T that does not necessarily include all available historical data. The span of the relevant period is also a domain-dependent decision.

The budget B can be defined in some embodiments as a function of the cache size, expressing the amount of space reserved for prefetches in the cache. It can also be defined as a function of an expected throughput value, expressing the constraint of how many pages or blocks can be loaded to cache per request.

Additional aspects of the computation of the earnings of each LUN at a given time instant are now discussed. Experimental validation suggests that the approach may benefit from constraining the value of $e_{LUN}$ between a preset minimum min and a maximum max value. Please note that while the parameter $\beta$ is a global minimum equally established for all LUNs, in one or more embodiments, here a minimum value is being described for the earning of each LUN. Intuitively, this accounts for the fact that LUNs that are under-represented and over-represented in the considered period T should not receive a proportional look-ahead window. This accounts for outliers and for natural variation in the access patterns that influence the computation of average request size and frequency for those LUNs. This is particularly important when considering, for example, a short period T for the measurements of $\bar{s}$ and $\bar{\lambda}$.

Figure 4:
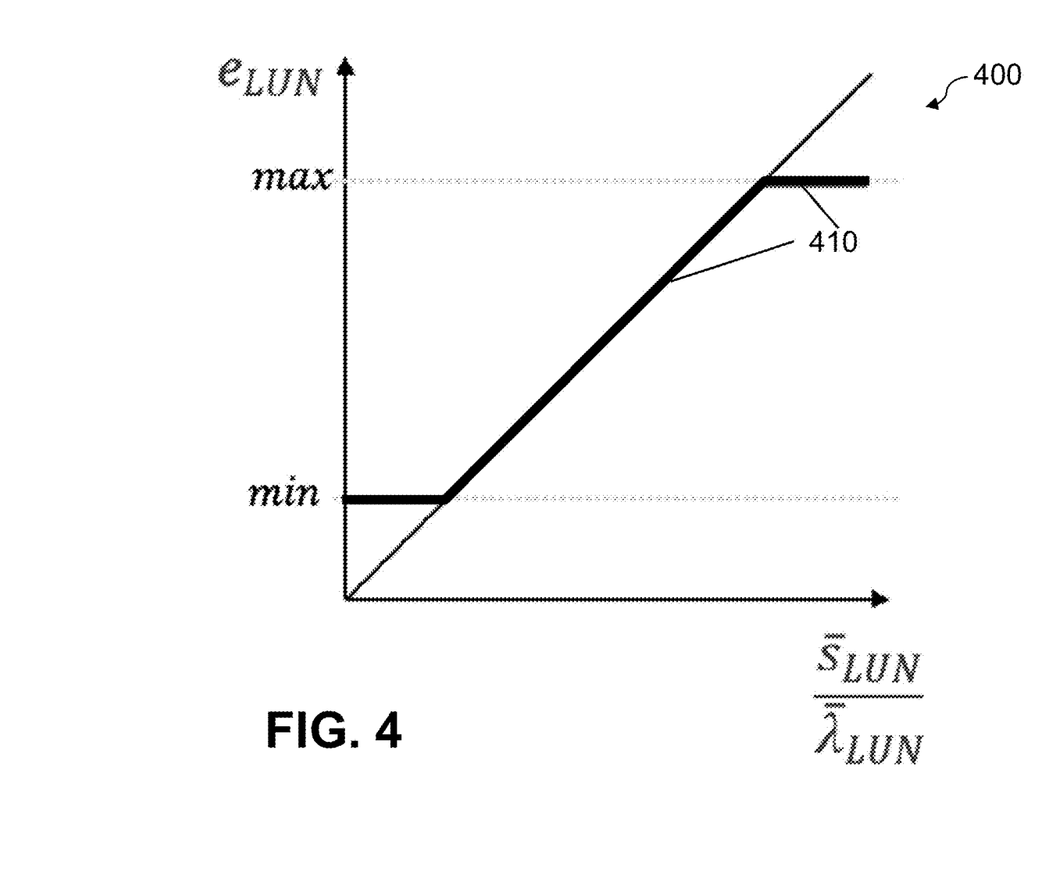
FIG. 4 illustrates a visual representation of exemplary minimum and maximum constraints over an earnings per LUN value, according to at least one embodiment of the disclosure.

FIG. 4 illustrates a visual representation 400 of exemplary minimum and maximum constraints over an earnings per LUN value, according to at least one embodiment of the disclosure. The thicker line 410 represents the constrained $e_{LUN}$ value in comparison to the original measurement given by $$\frac{s_{LUN}}{\lambda_{LUN}}.$$

One possible configuration of min and max is to consider historical data. In one embodiment of this disclosure, the historical distributions of the size and frequency of requests for each particular LUN are considered, as follows. Let $h_5$ be the fifth percentile and $h_{95}$ be the $95^{th}$ percentile of the size of all requests for the LUN. Similarly, let $d_5$ and $d_{95}$ be the historical $5^{th}$ and $95^{th}$ percentiles, respectively, of the distances between requests for the same LUN. Then $$\min = \frac{h_5}{d_{95}} \text{ and } \max = \frac{h_{95}}{d_5}.$$

Example

In one exemplary implementation of the disclosed adaptive look-ahead techniques for data prefetching based on request size and frequency processed real data collected from production systems. Those exemplary data sets contain traces at microsecond intervals. Each trace corresponds to one I/O request, and each request is represented by:

fileid: An identification of a storage system;
timestamp: The date and time of the request;
op: The type of operation (read, write, control, etc.);
cpu: The host controller in the system that handled the request;
tdev: An identification of a LUN of a system;
lba: The logical block address accessed by the request in the given LUN; and
size: The size of the operation in number of blocks.

For a given storage system (fileid), a cache buffer size is defined that reflects the average proportion of caches in production systems. Namely, the distinct LBA addresses accessed in each LUN (tdev) of the system are counted, and summed to estimate the total storage size. The exemplary cache buffer was defined to be 1% of the estimated storage size.

A baseline prefetching policy employs a fixed look-ahead window of "rounded-to" 256 blocks, which is close to a currently available prefetching policy. In this policy, the LUN is assumed to be virtually subdivided into segments of 256 contiguous blocks. Instead of always prefetching 256 blocks into the cache upon a cache-miss, this baseline policy rounds the look-ahead window size to the nearest 256-block boundary, for system performance.

Figure 5:
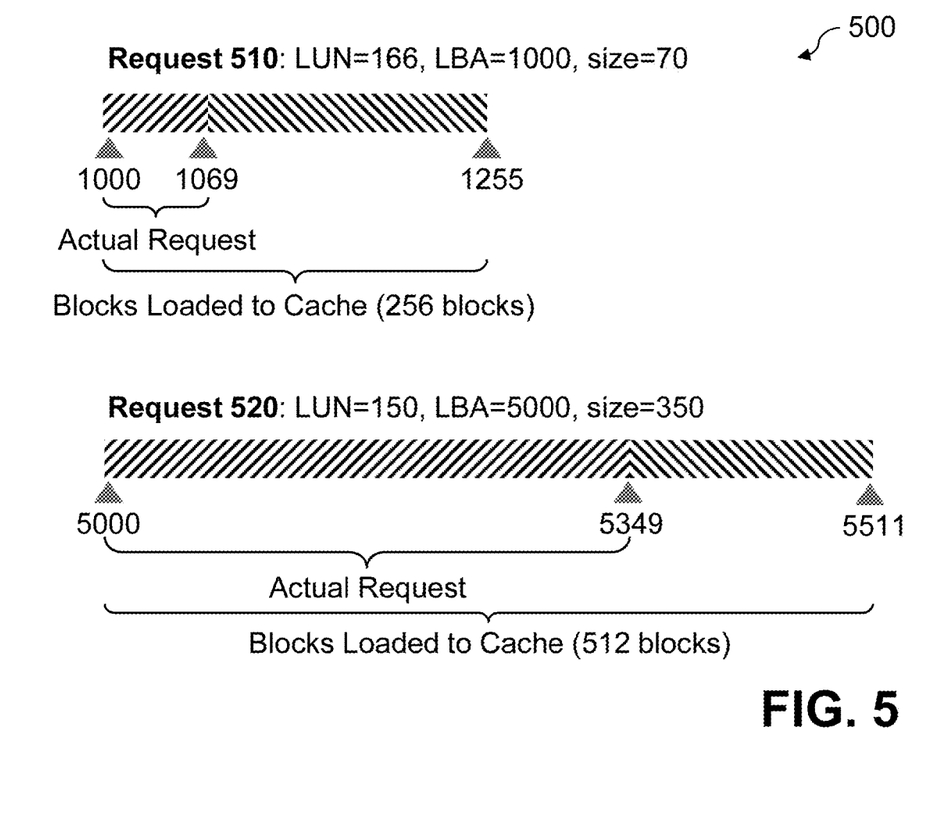
FIG. 5 illustrates an exemplary baseline prefetching policy that employs a fixed look-ahead window, according to one exemplary implementation.

FIG. 5 illustrates an exemplary baseline prefetching policy 500 that employs a fixed look-ahead window of "rounded-to" 256 blocks, according to one exemplary implementation. For example, if LBA=1000 and size=70, the baseline policy causes the system to prefetch only the next 186 blocks to the cache, as shown in FIG. 5. An LRU criterion is employed as an exemplary cache eviction.

As shown in FIG. 5, a look-ahead window value is employed for each LUN 130 of the storage system 125, according to some embodiments. A first request 510 is for LUN 166, and targets 70 blocks starting at the logical block address 1000. Using a look-ahead window value of 256 blocks for the request 510, the cache manager 120 will obtain the requested 70 blocks, as well as an additional 186 blocks to fill the look-ahead window, and will move the collected 256 blocks to the cache memory 150, except for those blocks already in the cache.

In addition, a second request 520 identifies LUN 150, and targets 350 blocks starting at the logical block address 5000. Using a look-ahead window value of 512 blocks for the request 520, the cache manager 120 will obtain the requested 350 blocks, as well as an additional 162 blocks to fill the look-ahead window, and will move the collected 512 blocks to the cache memory 150, except for those blocks already in the cache.

Figure 6:
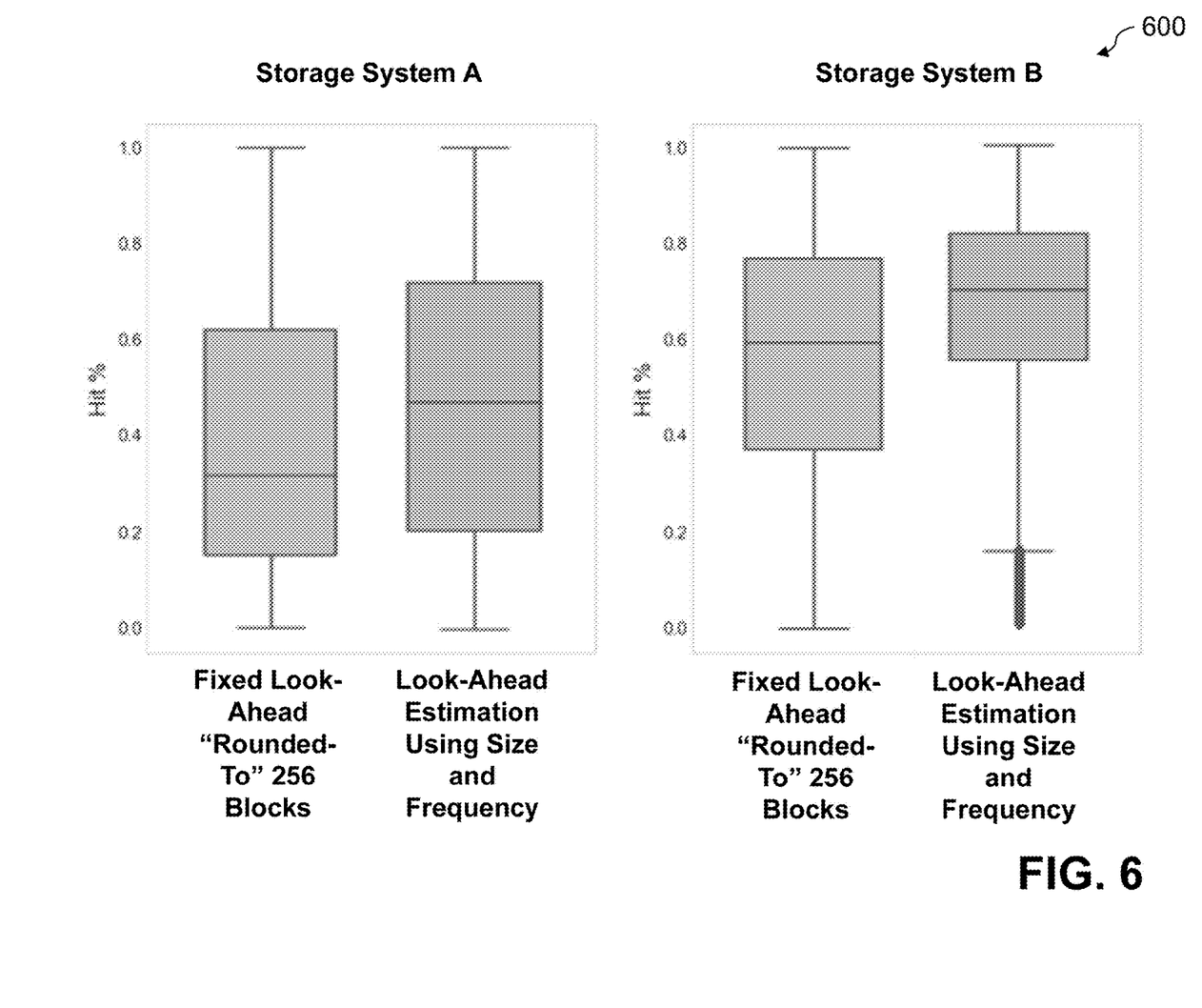
FIG. 6 illustrates an exemplary prefetching policy process based on request size and frequency, according to at least one embodiment of the disclosure.

FIG. 6 illustrates an exemplary prefetching policy process 600 based on request size and frequency, according to at least one embodiment. As shown in FIG. 6, the hit-ratio distribution is shown for a data set of two particular storage systems. The first storage system (system A) has 135 different tdev with 30 minutes of operation; the second storage system (system B) has 59 different tdev with 2 hours of operation. This data is shown as a distribution because the hit-ratio is computed for every 100 traces in the exemplary implementation. It can be shown that the two systems had considerably different behaviors. System A was more erratic, meaning that different groups of LUNs yielded different average request size and frequency, whereas System B was relatively more constant across all LUNs.

For the disclosed look-ahead estimation policy based on size and frequency, the look-ahead value for each LUN was updated, for example, at every 1000 I/O requests. The minimum look-ahead window was not limited but the maximum value was limited to 10K blocks (to avoid an excessively long execution time).

For storage systems A and B, a significant performance improvement is evident with the disclosed look-ahead policy compared to the baseline policy with the fixed look-ahead "rounded-to" 256 blocks of FIG. 5. The storage system A was more challenging considering the size and frequency of the requests per LUN that vary significantly over time. Thus, it was harder to obtain higher hit ratios as the I/O workload was less predictable. However, even in this scenario, the look-ahead estimation policy based on request size and frequency was able to achieve satisfactory hit ratios on average. On storage system B, the disclosed policy was also more effective, although the scenario was less challenging since the I/O workload was more stable and predictable.

In this manner, automatic, adaptive look-ahead configurations are provided that depend on characteristics of the workload of the applications that access the storage system. In particular, the disclosed prefetching techniques employ a mechanism that uses the frequency and the associated size of I/O requests for each portion of a storage system, such as a LUN.

One or more embodiments of the disclosure provide mechanisms to optimize the look-ahead window in cache prefetching policies for improving performance of a cache memory 150 in a storage system 125. The mechanisms proposed herein can be extended to other types of systems and protocols. For instance, they can be used in CPU caches (L1, L2, etc.), network switches, and storage tiering.

In some embodiments, the disclosed adaptive look-ahead techniques for data prefetching based on request size and frequency improve a performance (e.g., a cache hit ratio) for a cache memory 150. The disclosed adaptive look-ahead mechanism estimates the look-ahead window per LUN based on the size and frequency of the I/O requests of each LUN. Based on the size and frequency of the requests, a look-ahead window is computed for each LUN, based on an assumption that each LUN should occupy a fraction of the cache based on the characteristics of the workload of the respective LUN.

Among other benefits, the disclosed adaptive look-ahead techniques consider the average request size and frequency of input/output workloads. As noted above, the disclosed exemplary cache manager 120 of FIG. 1 addresses the cache optimization problem by automatically and adaptively choosing different look-ahead windows for each portion of the storage system, e.g., for each LUN of a storage system, to improve cache performance and application performance in general.

In some embodiments, the disclosed exemplary cache manager 120 of FIG. 1 maintains two measurements for each LUN: the average size and the average distance in time between its requests. Thus, in some implementations, the exemplary cache manager 120 stores the sum of the size, the sum of the distances between requests ($\lambda$) and the count of requests. With these integers, the exemplary cache manager 120 can update the value of E (the sum of the measure of earnings e for each LUN) for every LUN and, consequently update the look-ahead windows. In other words, the cache manager 120 optionally only needs three integers per LUN to apply the policy over time.

One or more embodiments of the disclosure provide improved methods, apparatus and computer program products for adaptive look-ahead for data prefetching based on request size and frequency. The foregoing applications and associated embodiments should be considered as illustrative only, and numerous other embodiments can be configured using the techniques disclosed herein, in a wide variety of different applications.

It should also be understood that the disclosed adaptive look-ahead techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for adaptive look-ahead for data prefetching may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based cache manager 120, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based cache prefetch manager platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
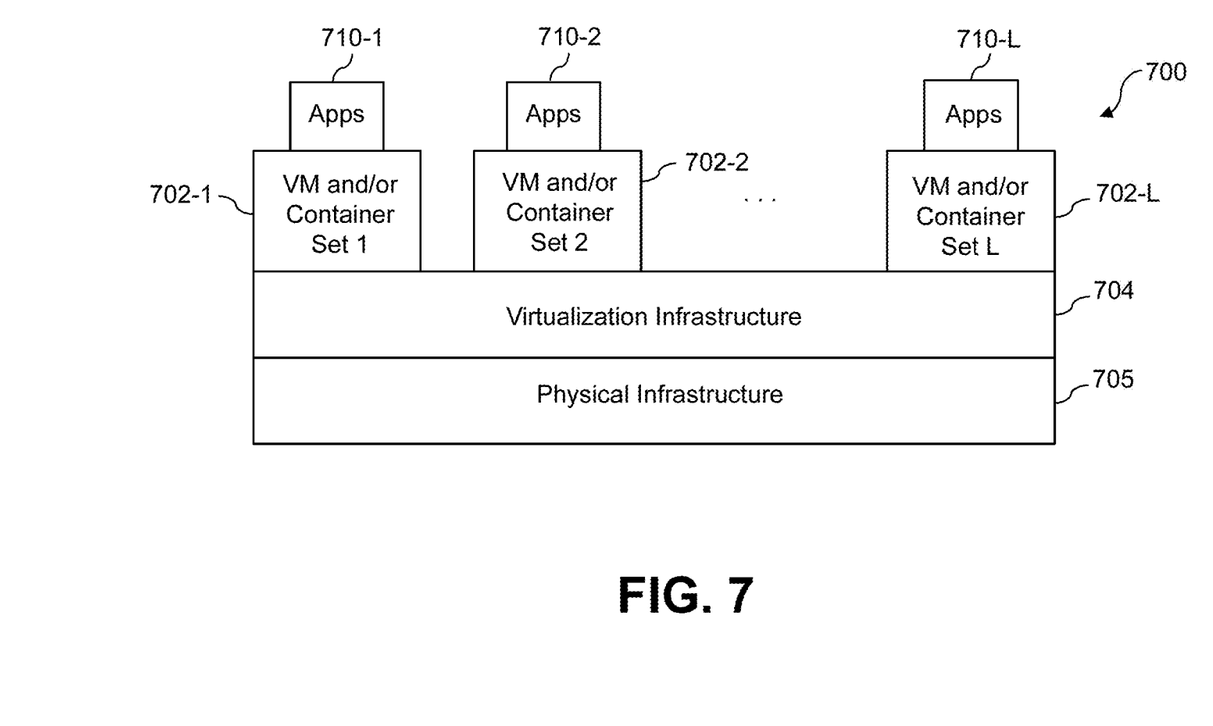
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the cache manager 120. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide adaptive look-ahead functionality of the type described above for one or more processes running on a given one of the VMs. For example, each of the VMs can implement adaptive look-ahead control logic for providing adaptive look-ahead window selection functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide adaptive look-ahead functionality of the type described above for one or more processes running on different ones of the containers. For example, a container host device supporting multiple containers of one or more container sets can implement one or more instances of adaptive look-ahead control logic for use in selecting look-ahead window values.

As is apparent from the above, one or more of the processing modules or other components of the storage environment 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
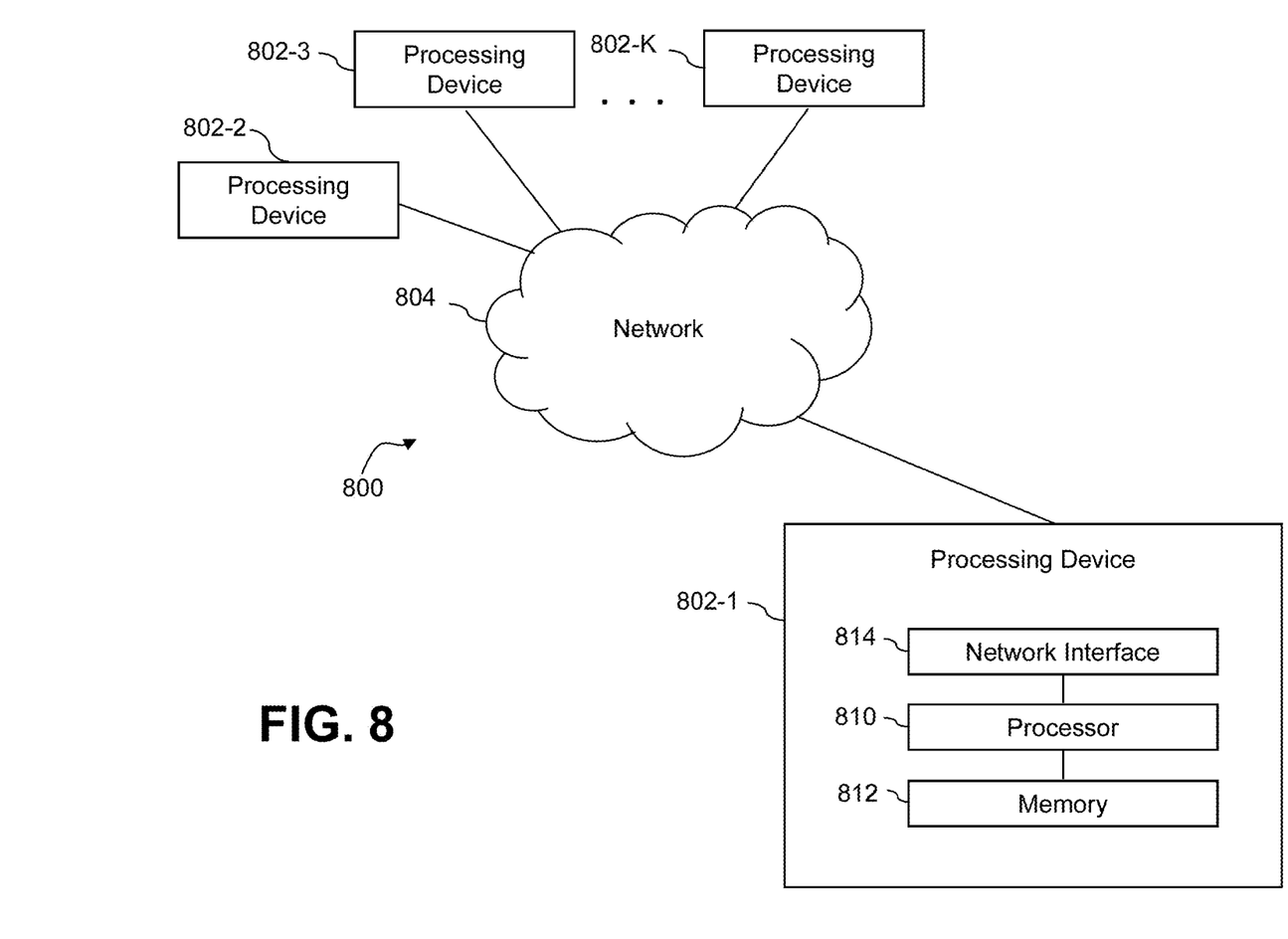
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
in response to a request for at least one data item residing in a particular portion of a storage system that employs a cache memory, performing the following steps, using at least one processing device:
estimating an earning value for the particular portion of the storage system based on an average size and a numerical value that estimates a frequency of past input/output requests for the particular portion of the storage system;
calculating a quota for the particular portion of the storage system by normalizing the earning value for the particular portion of the storage system based on one or more earning values of one or more additional portions of the storage system;
obtaining a size of a look-ahead window for the request based on the quota for the particular portion of the storage system over a prefetch budget assigned to the storage system; and
moving the requested at least one data item and one or more additional data items within the look-ahead window from the storage system to the cache memory responsive to one or more of the requested at least one data item and the additional data items within the look-ahead window not being in the cache memory.

2. The method of claim 1, wherein the particular portion of the storage system corresponds to one or more of a particular logical unit and a particular physical unit of the storage system.

3. The method of claim 1, wherein the requested at least one data item is identified by an address of a storage space of the storage system.

4. The method of claim 1, further comprising the step of varying one or more of the earning value, the quota and the size of the look-ahead window over time.

5. The method of claim 1, wherein the calculating comprises determining the quota that identifies how much the particular portion of the storage system will lead a substantially better performance on the cache system for a given update in the size of the look-ahead window, using one or more criteria based on features extracted from observed input/output traces.

6. The method of claim 1, wherein the obtaining assigns a larger look-ahead window to particular portions of the storage system that one or more of: (i) exhibit a larger average size of the input/output requests and (ii) exhibit a smaller average time distance between requests of the input/output requests.

7. The method of claim 1, wherein the obtaining assigns a look-ahead window within a predefined boundary that constrains a minimum value and a maximum value for the look-ahead window to particular portions of the storage system.

8. A system, comprising:
a memory; and
at least one processing device, coupled to the memory, operative to implement the following steps:
in response to a request for at least one data item residing in a particular portion of a storage system that employs a cache memory, performing the following steps:
estimating an earning value for the particular portion of the storage system based on an average size and a numerical value that estimates a frequency of past input/output requests for the particular portion of the storage system;
calculating a quota for the particular portion of the storage system by normalizing the earning value for the particular portion of the storage system based on one or more earning values of one or more additional portions of the storage system;
obtaining a size of a look-ahead window for the request based on the quota for the particular portion of the storage system over a prefetch budget assigned to the storage system; and
moving the requested at least one data item and one or more additional data items within the look-ahead window from the storage system to the cache memory responsive to one or more of the requested at least one data item and the additional data items within the look-ahead window not being in the cache memory.

9. The system of claim 8, wherein the particular portion of the storage system corresponds to one or more of a particular logical unit and a particular physical unit of the storage system.

10. The system of claim 8, wherein the requested at least one data item is identified by an address of a storage space of the storage system.

11. The system of claim 8, further comprising the step of varying one or more of the earning value, the quota and the size of the look-ahead window over time.

12. The system of claim 8, wherein the calculating comprises determining the quota that identifies how much the particular portion of the storage system will lead a substantially better performance on the cache system for a given update in the size of the look-ahead window, using one or more criteria based on features extracted from observed input/output traces.

13. The system of claim 8, wherein the obtaining assigns a larger look-ahead window to particular portions of the storage system that one or more of: (i) exhibit a larger average size of the input/output requests and (ii) exhibit a smaller average time distance between requests of the input/output requests.

14. The system of claim 8, wherein the obtaining assigns a look-ahead window within a predefined boundary that constrains a minimum value and a maximum value for the look-ahead window to particular portions of the storage system.

15. A computer program product, comprising a non-transitory machine-readable storage medium having encoded therein executable code of one or more software programs, wherein the one or more software programs when executed by at least one processing device perform the following steps:
in response to a request for at least one data item residing in a particular portion of a storage system that employs a cache memory, performing the following steps:
estimating an earning value for the particular portion of the storage system based on an average size and a numerical value that estimates a frequency of past input/output requests for the particular portion of the storage system;
calculating a quota for the particular portion of the storage system by normalizing the earning value for the particular portion of the storage system based on one or more earning values of one or more additional portions of the storage system;

obtaining a size of a look-ahead window for the request based on the quota for the particular portion of the storage system over a prefetch budget assigned to the storage system; and moving the requested at least one data item and one or more additional data items within the look-ahead window from the storage system to the cache memory responsive to one or more of the requested at least one data item and the additional data items within the look-ahead window not being in the cache memory.

16. The computer program product of claim 15, wherein the requested at least one data item is identified by an address of a storage space of the storage system.

17. The computer program product of claim 15, further comprising the step of varying one or more of the earning value, the quota and the size of the look-ahead window over time.

18. The computer program product of claim 15, wherein the calculating comprises determining the quota that identifies how much the particular portion of the storage system will lead a substantially better performance on the cache system for a given update in the size of the look-ahead window, using one or more criteria based on features extracted from observed input/output traces.

19. The computer program product of claim 15, wherein the obtaining assigns a larger look-ahead window to particular portions of the storage system that one or more of: (i) exhibit a larger average size of the input/output requests and (ii) exhibit a smaller average time distance between requests of the input/output requests.

20. The computer program product of claim 15, wherein the obtaining assigns a look-ahead window within a predefined boundary that constrains a minimum value and a maximum value for the look-ahead window to particular portions of the storage system.

* * * * *

UNITED STATES PATENT AND TRADEMARK OFFICE
CERTIFICATE OF CORRECTION

PATENT NO. : 10,871,902 B2  
APPLICATION NO. : 16/397596  
DATED : December 22, 2020  
INVENTOR(S) : Jonas F. Dias et al.

It is certified that error appears in the above-identified patent and that said Letters Patent is hereby corrected as shown below:

On the Title Page

Item (57), in the Abstract, Lines 4-5, replace "estimating an earning value for a particular portion based on an average size" with -- estimating an earning value for a particular portion of a storage system based on an average size --

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*